(12) United States Patent
Carter et al.

(10) Patent No.: US 6,170,724 B1
(45) Date of Patent: Jan. 9, 2001

(54) STORAGE DEVICE FOR USE WITH TRUCKS

(75) Inventors: Robert B. Carter, Dallas, TX (US); Eric Garris, Sanford; Kurt Menke, Raleigh, both of NC (US)

(73) Assignee: Markets Direct, Inc., Dallas, TX (US)

( * ) Notice: Under 35 U.S.C. 154(b), the term of this patent shall be extended for 0 days.

(21) Appl. No.: 09/396,221

(22) Filed: Sep. 15, 1999

Related U.S. Application Data

(60) Provisional application No. 60/100,545, filed on Sep. 16, 1998.

(51) Int. Cl.[7] .......................................................... B60R 9/00
(52) U.S. Cl. ........................ 224/404; 224/498; 224/542; 224/543; 296/37.6; 220/4.29; 220/7; 220/811
(58) Field of Search ................................. 224/321, 403, 224/404, 497, 498, 499, 511, 527, 526, 539, 542, 543, 544, 548, 549, 553, 554, 555, 556; 296/37.6; 190/107; 220/4.29, 6, 7, 811

(56) References Cited

U.S. PATENT DOCUMENTS

| | | | |
|---|---|---|---|
| 4,215,896 | * | 8/1980 | Drouin ............................. 296/37.6 X |
| 5,669,537 | * | 9/1997 | Saleem et al. ....................... 224/539 |
| 5,671,857 | * | 9/1997 | Stromberg ............................... 220/7 |
| 5,853,116 | * | 12/1998 | Schreiner ............................. 224/404 |
| 5,964,492 | * | 10/1999 | Lyon .................................. 296/37.6 |
| 6,056,177 | * | 5/2000 | Schneider ............................ 224/401 |
| 6,065,794 | * | 5/2000 | Schlachter ........................... 296/37.6 |
| 6,098,827 | * | 8/2000 | Overbolt et al. ......................... 220/6 |

\* cited by examiner

*Primary Examiner*—Stephen K. Cronin
(74) *Attorney, Agent, or Firm*—David H. Judson

(57) ABSTRACT

A collapsible storage device for use in a pickup truck bed including a rear panel; a lower panel hingeably mounted to a lower edge of the rear panel at a first edge; a first side panel hingeably mounted to a first side edge of the rear panel at a first edge; a second side panel hingeably mounted to a first side edge of the rear panel at a first edge; a first compression mounting mounted to the face of the first side panel such that the first compression mounting is compressed between the first side panel and a first sidewall of the pickup truck bed when the first side panel is in an open position; a second compression mounting mounted to the face of the second side panel such that the second compression mounting is compressed between the second side panel and a second sidewall opposing the first sidewall of the pickup truck bed when the second side panel is in an open position; a top panel hingeably mounted to a top edge of the rear panel at a first edge, the top panel resting on a top edge of the first and second side panels when the first and second side panels are in an open position.

18 Claims, 4 Drawing Sheets

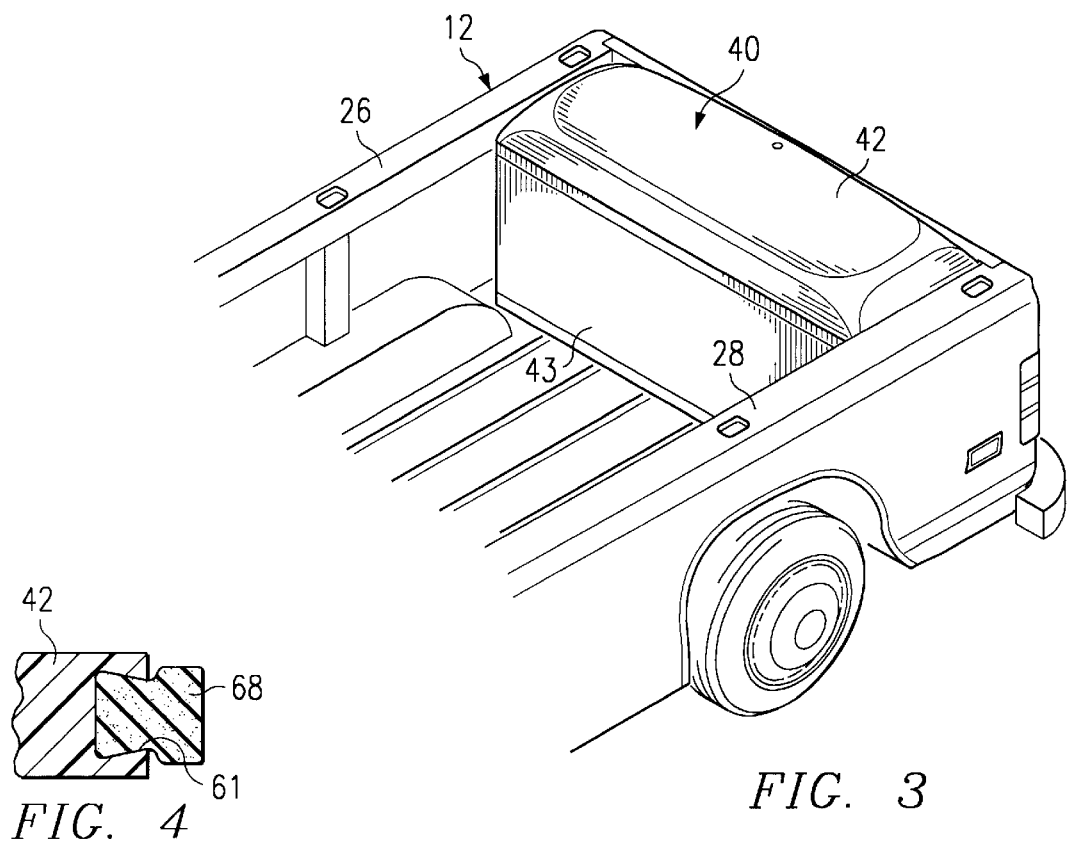
FIG. 3
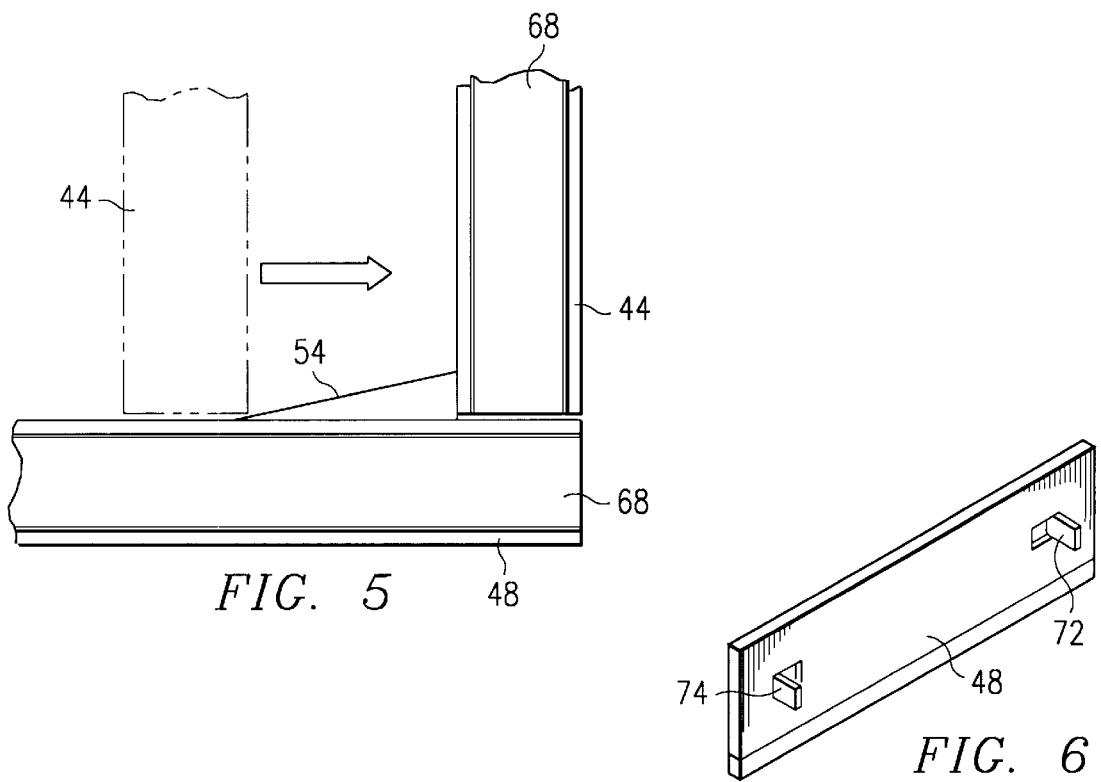
FIG. 4
FIG. 5
FIG. 6

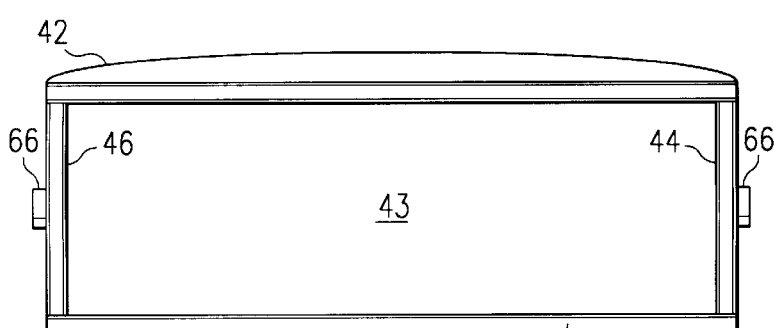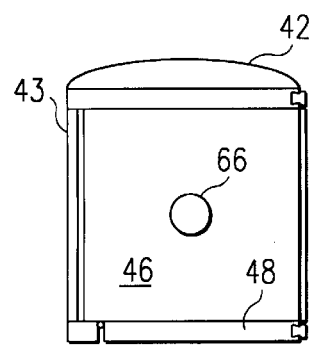
FIG. 7A  FIG. 7B
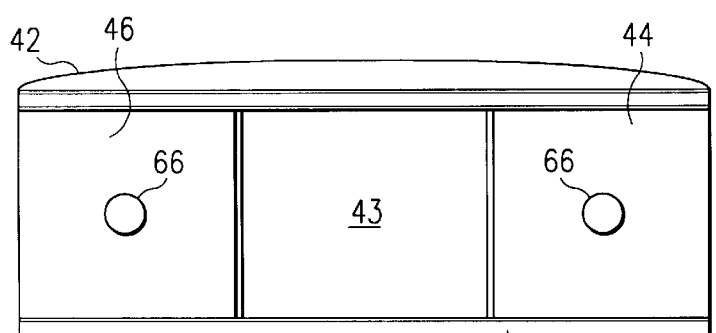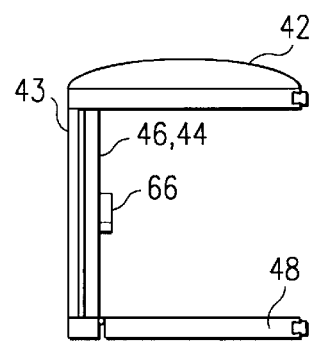
FIG. 8A  FIG. 8B
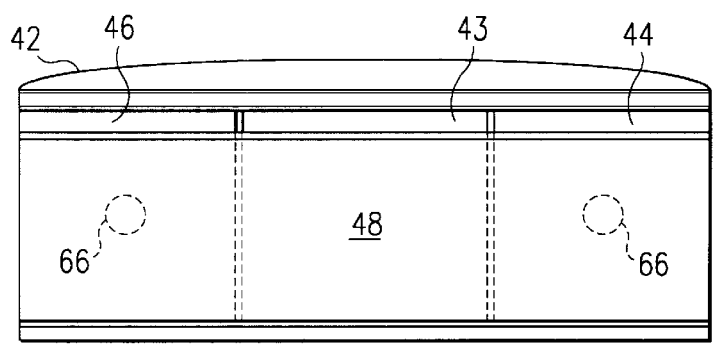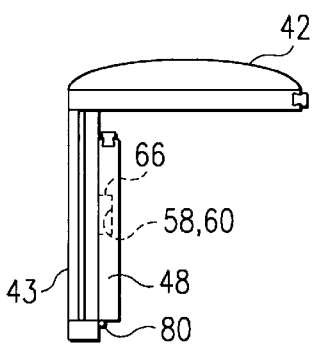
FIG. 9A  FIG. 9B
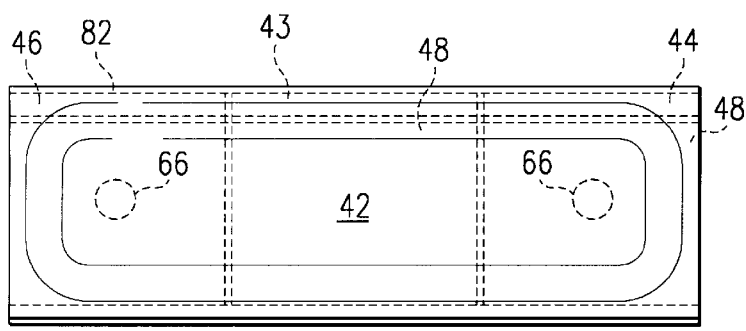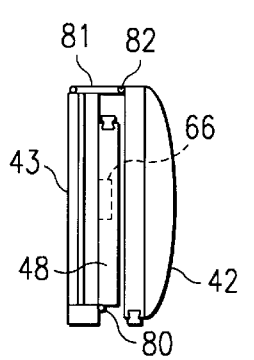
FIG. 10A  FIG. 10B

STORAGE DEVICE FOR USE WITH TRUCKS

RELATED APPLICATIONS

This application claims the benefit of U.S. Provisional Application No. 60/100,545, filed Sep. 16, 1999.

This application is also related to co-pending application Serial No. 09/039,215, filed Mar. 14, 1998.

BACKGROUND OF THE INVENTION

1. Technical Field

The present invention relates to the field of accessories for trucks. More specifically, the present invention relates to an enclosure for use with pickup trucks.

2. Description of the Related Art

Because of their huge cargo capacity, pickup trucks are popular vehicles. However, they present some drawbacks for individual, day to day use. A particular problem stems for the lack of enclosed storage space.

Presently, there is a lack of secure storage in a pickup truck. Any object may be lifted out of the bed when unattended. Even in the cab, there is no place to hide valuables from view unless they are small enough to store in the glove box. This provides a tempting target for thieves to break into the truck. Examples of cargo that is at risk include golf clubs, power tools, etc.

One method of addressing this problem is trunk boxes that mount to the side rails of the vehicle next to the cab. However, these boxes are very difficult to access particularly for smaller people. Moreover, after gaining access to such a trunk box, it is common to take the items to the tailgate to perform work with them. In addition, these boxes are generally permanently mounted, thus shrinking the useable truck bed area.

Therefore, there is a need for a secure enclosure that is convenient to access and does not permanently occupy truck bed space.

BRIEF SUMMARY OF THE INVENTION

It is an object of the present invention to provide a secure enclosure for use with a pickup truck.

It is another object of the present invention to provide an enclosure that is easily accessed.

It is a further object of the present invention to provide an enclosure that may be collapsed for easy storage when not in use.

It is an additional object of the present invention to provide an enclosure that is securely mounted in the bed of a pickup truck.

These and other objects of the present invention are provided by a collapsible storage device for use in a pickup truck bed including a rear panel; a lower panel hingeably mounted to a lower edge of the rear panel at a first edge; a first side panel hingeably mounted to a first side edge of the rear panel at a first edge; a second side panel hingeably mounted to a first side edge of the rear panel at a first edge; a first compression mounting mounted to the face of the first side panel such that the first compression mounting is compressed between the first side panel and a first sidewall of the pickup truck bed when the first side panel is in an open position; a second compression mounting mounted to the face of the second side panel such that the second compression mounting is compressed between the second side panel and a second sidewall opposing the first sidewall of the pickup truck bed when the second side panel is in an open position; a top panel hingeably mounted to a top edge of the rear panel at a first edge, the top panel resting on a top edge of the first and second side panels when the first and second side panels are in an open position, wherein the storage device provides an enclosed compartment when the first and second panels are in the open position and the storage device is positioned in the pickup truck bed such that a second edge opposite the first edge of each of the top, lower, first side and second side panels is positioned adjacent to a tailgate of the pickup truck bed when the tailgate is in the closed position.

BRIEF DESCRIPTION OF THE DRAWINGS

For a more complete understanding of the present invention and the advantages thereof, reference should be made to the following Detailed Description taken in connection with the accompanying drawings in which:

FIG. 3 is another perspective view of the embodiment of FIG. 1;

FIG. 4 is a cutaway detail showing the edge seal of the embodiment of FIG. 1;

FIG. 5 is a detail of a preferred latching mechanism for the sidewalls of the embodiment of FIG. 1;

FIG. 6 is a perspective view of an additional embodiment for providing a raised enclosure;

FIGS. 7A and 7B are front and side views, respectively, showing a first step in collapsing the embodiment of FIG. 1;

FIGS. 8A and 8B are front and side views, respectively, showing a first step in collapsing the embodiment of FIG. 1;

FIGS. 9A and 9B are front and side views, respectively, showing a first step in collapsing the embodiment of FIG. 1; and FIGS. 10A and 10B are front and side views, respectively, showing a first step in collapsing the embodiment of FIG. 1.

DETAILED DESCRIPTION OF THE PREFERRED EMBODIMENT

Figure 1:
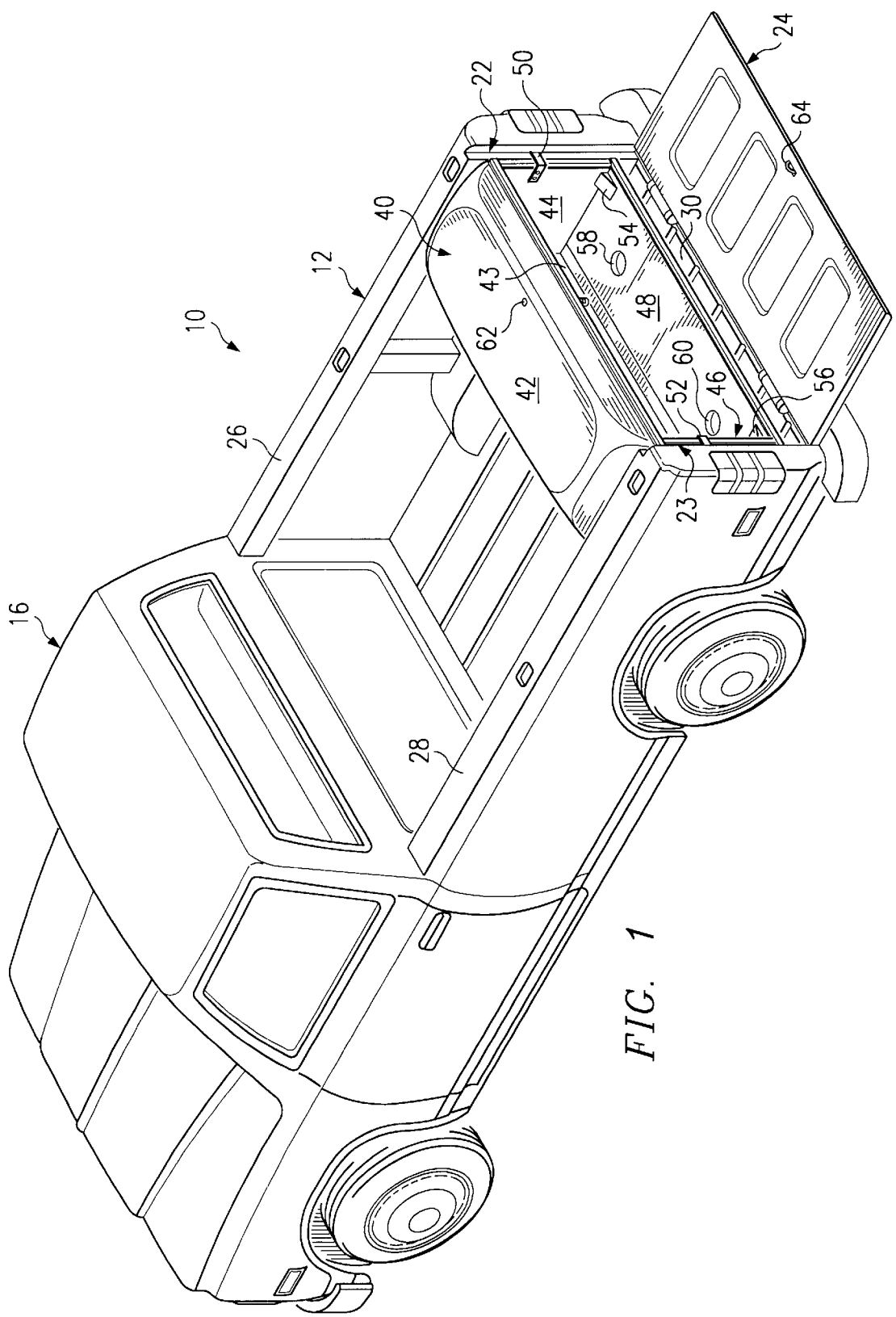
FIG. 1 is a perspective view of an embodiment of the present invention installed in the bed of a pickup truck.

FIG. 1 is a perspective view of one embodiment of the present invention installed in a pickup truck bed 12. Enclosure 40 is installed in the rear portion of the bed 12 of truck 10. Top panel 42 provides the top of the enclosure 40. The top surface of top panel 42 is convex or humped. This provides increased structural rigidity. In addition, the raised profile avoids pooling of water on the surface of top panel 42. The top surface of top panel 42 may also be padded. The padding allows for comfortable seating on the top of enclosure 40, if desired.

Top panel 42 is mounted to rear panel 43 using a hinge. The hinge may be a separate hinge or hinge components formed in top panel 42 and rear panel 43 and fitted together. Preferably, the hinge is cantilevered as explained below. The panels of enclosure 40 may be fabricated from a variety of materials. Examples of materials are wood, metal, plastic and fiberglass. A preferred material is two-layer, tack welded polyethylene plastic. This material can be economically formed in the desired shape. Using know engineering techniques, it can provide more than adequate strength. In addition, it is weather resistant and easily cleaned.

Left side panel 46 and right side panel 44 are hingeably mounted to rear panel 43. Lower panel 48 is also hingeably mounted to rear panel 43. L-brackets 50 and 52 are mounted to side panels 44 and 46, respectively. L-brackets 50 and 52 are preferably mounted using high strength bolts through side panels 44 and 46. When side panels 44 and 46 are in the open position as shown in FIG. 1, L-brackets 50 and 52 extend over the edges 22 and 23 of bed 12. When tailgate 24 is closed, L-brackets 50 and 52 are compressed between tailgate 24 and edges 22 and 23. This prevents movement of the enclosure 40 toward the cab 16 in case of a sudden stop or a collision. Optionally, a lock may be provided by keyed latch 62 and catch 64. Catch 64 may be conveniently mounted on tailgate 24 using the bolts (not shown) used to fasten the tailgate latch (not shown) to the interior of the tailgate 24.

Figure 2:
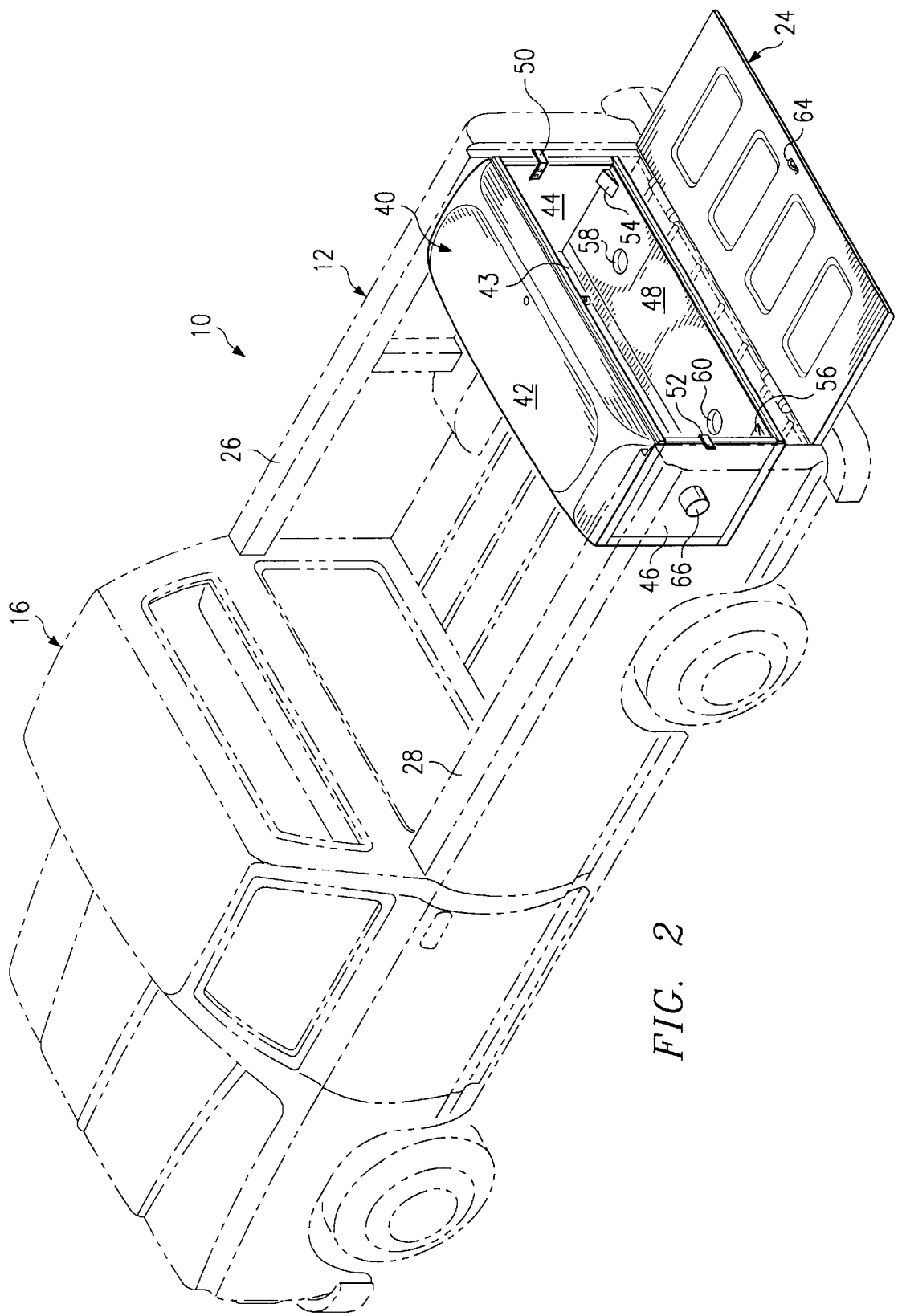
FIG. 2 is a perspective view of the embodiment of FIG. 1 with a portion of the sidewall of the pickup truck bed in phantom.

Side panels 44 and 46 are firmly held in place by ramp latches 54 and 56. Preferably, additional ramp latches (not shown) are provided on the lower surface of top panel 42. Enclosure 40 is held firmly in place by compressive forces as shown in FIG. 2. When left side panel 46 is swung into place, compression mounting 66 is compressed between left side panel 46 and sidewall 26 of bed 12. Compression mounting 66 is preferably made from high-density foam. Compression mounting 66 is firmly mounted to left side panel 46. Preferably, an indentation (not shown) matching the profile of compression mounting 66 is formed in left side panel 46. This prevents the lateral movement of compression mounting 66 relative to left side panel 46. The frictional forces between compression mounting 66 and sidewall 26 prevent the lateral movement of compression mounting 66 relative to sidewall 26. An additional compression mounting (not shown) is provided between right side panel 44 and sidewall 28. The combined effect of the compression mountings is that enclosure 40 is firmly mounted in bed 12. FIG. 3 is another perspective view of enclosure 40 mounted in bed 12.

FIG. 4 is a cutaway view detailing the mounting of edge seal 68 to the panels of enclosure 40. The example shown is top panel 42, but all panels, except the rear panel, preferably include seal 68 on the edge of the respective panels that abuts tailgate 24 when closed. This provides a weather resistant container to protect the contents of enclosure 40. Edge seal 68 is preferably foam rubber, but other suitable materials are known in the art. A dovetail opening 61 is formed in the edge of top panel 42 and seal 68 is pressed in dovetail opening 61. The 'pinching' portions of dovetail opening 61 hold edge seal 68 in place. In another preferred embodiment, edge seal 68 may be molded to conform to opening 61 to provide a more secure fit.

The operation of ramp latch 54 is shown in FIG. 5. Enclosure 40 is set up by expanding the top panel 42, lower panel 48 and side panels 44 and 46. To hold side panels 44 and 46 in place and provide compressive force on compression mountings 66, ramp latches 54 and 56 are provided. As, for example, right side panel 44 is swung out, the lower edge of right side panel 44 rides up the sloped edge of ramp latch 54. After passing the peak of ramp latch 54, right side panel 44 will drop to abut the vertical edge of ramp latch 54. This holds right side panel 44 firmly in the open position. Other latches known in the art may be suitably substituted for ramp latch 54, such as a slam latch. Another type of latch is a pin or other device placed in a hole in lower panel 48 after swinging right side panel 44 into position. The primary requirement of latch 54 is the capability to provide constant pressure to compression mounting 66.

FIG. 6 is a lower perspective view of lower panel 48 showing optional legs 72 and 74. Legs 72 and 74 raise the enclosure 40 to allow for lengthy items such as lumber to be carried beneath enclosure 40. When enclosure 40 is installed with legs 72 and 74 extended, a gap exists which allow the longer items to be slid under enclosure 40. With an enclosure that includes legs 72 and 74, the width of rear panel 43 and side panels 44 and 46 is chosen so that top panel 42 aligns with the top of tailgate 24 with the legs extended. Then, if legs 72 and 74 are not extended, top panel 42 will abut a portion of tailgate 24 below the top edge. However, this is preferable to having a top panel 42 positioned above tailgate 24 when legs 72 and 74 are extended, thus presenting a gap opening to the enclosure when tailgate 24 is up.

In additional embodiment, side panels 44 and 46, and rear panel 43 are selected to have a height significantly shorter than tailgate 24. This allows for lengthy objects to be placed on top of the enclosure 40.

FIGS. 7A through 10A and 7B through 10B are front and side views showing the process of collapsing enclosure 40 for storage. In FIGS. 7A and 7B, enclosure 40 is in the fully opened position. To begin the collapsing process, ramp latches 54 and 56 are disengaged and side panels 44 and 46 are swung about their hinges to a position parallel and abutting rear panel 43 as shown in FIGS. 8A and 8B. Next, lower panel 48 is folded up at hinged point 80 as shown in FIGS. 9A and 9B. Hinged point 80 is separated from rear panel 43 by the necessary distance to clear folded side panels 44 and 46. Indentations 58 and 60 in lower panel 48 receive compression mountings 66. Finally, top panel 42 is folded downward as shown in FIGS. 10A and 10B. Top panel 42 is preferably mounted using a cantilevered hinge 81 with a sliding hinge point 82. First, top panel 42 is slid away from rear panel in a direction perpendicular to the main plane of rear panel 43 and then top panel 42 is folded downward. By using a cantilevered hinge, clearance is provided to clear the folded lower panel 48 and side panels 44 and 46. Using a sliding hinge point allows for the rear edge of top panel 42 to align with the top enclosure 40 when folded. This provides as compact a unit as possible to facilitate storage and shipping.

As has been shown, enclosure 40 provides a secure enclosure at the tailgate of a vehicle, such as a pickup truck, that allows the user to securely store items in the back end of the truck bed. Placing the enclosure at the rear of the truck provides greater accessibility as compared with prior art storage devices. By using a lock in the tailgate, if the truck is so equipped, or by providing a lock between the tailgate and enclosure provides secure storage. The described embodiment of the present invention also is collapsible to provide compact storage of enclosure 40 when not in use. This allows the truck owner complete use of their payload. Enclosure 40 can be easily installed or uninstalled in approximately 30 seconds. Moreover, the present invention does not require any modification to the user's truck. No holes must be drilled or other modifications to the truck are required.

The present invention provides the following features and benefits: maximum secured storage space, convenient tail gate access, no drilling is required, it does not prevent access to the full bed, it can installed and removed in under 30 seconds. In addition, it is convenient to the tailgate, which provides a work surface. A further advantage is that, when collapsed, the enclosure may be shipped using common package carriers such as United Parcel Service, thus avoiding expensive custom shipping.

Although specific embodiments of the invention are herein disclosed, they are not to be construed as limiting the scope of the invention. Many variants of the invention will become apparent to those skilled in the art in light of the teachings of this specification. The scope of the invention is only limited by the claims appended hereto.

What is claimed is:

1. A collapsible storage device for use in a pickup truck bed comprising:
   a rear panel;
   a lower panel hingeably attached to a lower edge of the rear panel at a first edge;
   a first side panel hingeably attached to a first side edge of the rear panel at a first edge;
   a second side panel hingeably attached to a first side edge of the rear panel at a first edge;
   a first compression mounting attached to the face of the first side panel such that the first compression mounting is compressed between the first side panel and a first sidewall of the pickup truck bed when the first side panel is in an open position;
   a second compression mounting attached to the face of the second side panel such that the second compression mounting is compressed between the second side panel and a second sidewall opposing the first sidewall of the pickup truck bed when the second side panel is in an open position;
   a top panel hingeably attached to a top edge of the rear panel at a first edge, the top panel resting on a top edge of the first and second side panels when the first and second side panels are in an open position, wherein the storage device provides an enclosed compartment when the first and second panels are in the open position and the storage device is positioned in the pickup truck bed such that a second edge opposite the first edge of each of the top, lower, first side and second side panels is positioned adjacent to a tailgate of the pickup truck bed when the tailgate is in a closed position.

2. A collapsible storage device as in claim 1 wherein the top panel is attached to the rear panel using a cantilevered hinge.

3. A collapsible storage device as in claim 2 wherein the top panel is attached such that it may slide in the direction perpendicular to the axis of the cantilevered hinge.

4. A collapsible storage device as in claim 1 wherein the top panel, the rear panel, the first and second side panels and the lower panel are formed from polyethylene plastic.

5. A collapsible storage device as in claim 1 wherein the top surface of the top panels is convex.

6. A collapsible storage device as in claim 1 further comprising a lock in the top panel and a latch for attachment to the tail gate of the pickup truck bed to engage the lock.

7. A collapsible storage device as in claim 1 further comprising at least one bracket attached to the side panels for engaging an edge of the tailgate of the pickup truck bed.

8. A collapsible storage device as in claim 1 wherein the lower panel includes indentations to receive the first and second compression mountings when the collapsible storage device is fully folded.

9. A collapsible storage device as in claim 1 further comprising extendible legs on the lower surface of the lower panel.

10. A method for forming a collapsible storage device for use in a pickup truck bed, comprising the steps of:
    providing a rear panel;
    hingeably mounting a lower panel to a lower edge of the rear panel at a first edge;
    hingeably mounting a first side panel to a first side edge of the rear panel at a first edge;
    hingeably mounting a second side panel to a first side edge of the rear panel at a first edge;
    mounting a first compression mounting to the face of the first side panel such that the first compression mounting is compressed between the first side panel and a first sidewall of the pickup truck bed when the first side panel is in an open position;
    mounting a second compression mounting to the face of the second side panel such that the second compression mounting is compressed between the second side panel and a second sidewall opposing the first sidewall of the pickup truck bed when the second side panel is in an open position;
    hingeably mounting a top panel to a top edge of the rear panel at a first edge, the top panel resting on a top edge of the first and second side panels when the first and second side panels are in an open position, wherein the storage device provides an enclosed compartment when the first and second panels are in the open position and the storage device is positioned in the pickup truck bed such that a second edge opposite the first edge of each of the top, lower, first side and second side panels is positioned adjacent to a tailgate of the pickup truck bed when the tailgate is in a closed position.

11. A method for forming a collapsible storage device as in claim 10 wherein the top panel is attached to the rear panel using a cantilevered hinge.

12. A method for forming a collapsible storage device as in claim 11 wherein the top panel is attached such that it may slide in the direction perpendicular to the axis of the cantilevered hinge.

13. A method for forming a collapsible storage device as in claim 10 wherein the top panel, the rear panel, the first and second side panels and the lower panel are formed from polyethylene plastic.

14. A method for forming a collapsible storage device as in claim 10 wherein the top surface of the top panels is convex.

15. A method for forming a collapsible storage device as in claim 10 further comprising the steps of:
    mounting a lock in the top panel; and
    mounting a latch for attachment to the tail gate of the pickup truck bed to engage the lock.

16. A method for forming a collapsible storage device as in claim 10 further comprising the steps of:
    attaching at least one bracket to the side panels for engaging an edge of the tailgate of the pickup truck bed.

17. A method for forming a collapsible storage device as in claim 10 wherein the lower panel includes indentations to receive the first and second compression mountings when the collapsible storage device is fully folded.

18. A method for forming a collapsible storage device as in claim 10 further comprising the step of mounting extendible legs to the lower surface of the lower panel.

* * * * *